United States Patent
Sanchez et al.

(10) Patent No.: US 7,584,887 B1
(45) Date of Patent: Sep. 8, 2009

(54) CO-BRANDED CORRELATED REDEEMABLE CARDS

(75) Inventors: Jose Sanchez, Louisville, KY (US); William D. Hill, Crestwood, KY (US)

(73) Assignee: Comdata Stored Value Solutions, Inc., Brentwood, TN (US)

( * ) Notice: Subject to any disclaimer, the term of this patent is extended or adjusted under 35 U.S.C. 154(b) by 0 days.

(21) Appl. No.: 11/779,321

(22) Filed: Jul. 18, 2007

Related U.S. Application Data

(60) Provisional application No. 60/831,622, filed on Jul. 18, 2006.

(51) Int. Cl.
*G06K 5/00* (2006.01)

(52) U.S. Cl. .................. 235/380; 235/448; 235/493

(58) Field of Classification Search ........... 235/380, 235/448, 493
See application file for complete search history.

(56) References Cited

U.S. PATENT DOCUMENTS

| | | | |
|---|---|---|---|
| 4,938,506 A | 7/1990 | Matsuguchi et al. | |
| 5,427,832 A | 6/1995 | Longtin | |
| 5,667,247 A | 9/1997 | Ramsburg et al. | |
| 5,777,305 A | 7/1998 | Smith et al. | |
| 6,109,439 A | 8/2000 | Goade, Sr. | |
| 6,315,206 B1 | 11/2001 | Hansen et al. | |
| 6,454,165 B1 | 9/2002 | Dawson | |
| 6,543,809 B1 | 4/2003 | Kistner et al. | |
| 6,679,970 B2 | 1/2004 | Hwang | |
| 6,698,116 B2 | 3/2004 | Waldron | |
| 6,715,795 B2 | 4/2004 | Klure | |
| 6,814,375 B2 | 11/2004 | Cox et al. | |
| 6,957,737 B1 | 10/2005 | Frederickson et al. | |
| 2005/0247798 A1* | 11/2005 | Graves et al. ............... | 235/493 |
| 2006/0131398 A1* | 6/2006 | Lewis et al. ................ | 235/380 |
| 2006/0186196 A1* | 8/2006 | Schultz et al. ............. | 235/380 |
| 2006/0243794 A1* | 11/2006 | Whitaker .................... | 235/380 |
| 2007/0252009 A1* | 11/2007 | Kingsborough et al. .... | 235/487 |

* cited by examiner

*Primary Examiner*—Allyson N Trail
(74) *Attorney, Agent, or Firm*—Waddey & Patterson; Edward D. Lanquist, Jr.

(57) ABSTRACT

A card carrier is displayed for sale with at least two independently redeemable cards affixed thereto. A barcode is displayed on the package that is associated with an account number encoded on a magnetic stripe or barcode of each of the cards. Both cards are valued at a point of sale by a sales clerk scanning in the single bar code on the package. The cards can then be redeemed at a merchant associated with each of the cards.

10 Claims, 2 Drawing Sheets

CO-BRANDED CORRELATED REDEEMABLE CARDS

CROSS-REFERENCES TO RELATED APPLICATIONS

This application is a Non-Provisional Utility application which claims benefit of U.S. Patent Application Ser. No. 60/831,622 filed Jul. 18, 2006, entitled "CO-BRANDED CORRELATED REDEEMABLE CARDS" which is hereby incorporated by reference.

DETAILED DESCRIPTION OF THE INVENTION

The purpose of this design is to house two completely different cards specific to two different entities or clients that will want to share the same distribution channel without the need of making lengthy and expensive point-of-sale (POS) changes. This package will accomplish a 3-way match; two distinct card numbers cross reference to a third account number that a card issuer and its third-part distribution channels can accept. The idea arose out of the necessity of having synergetic clients share distribution channels with minimal POS intervention.

Figure 1:
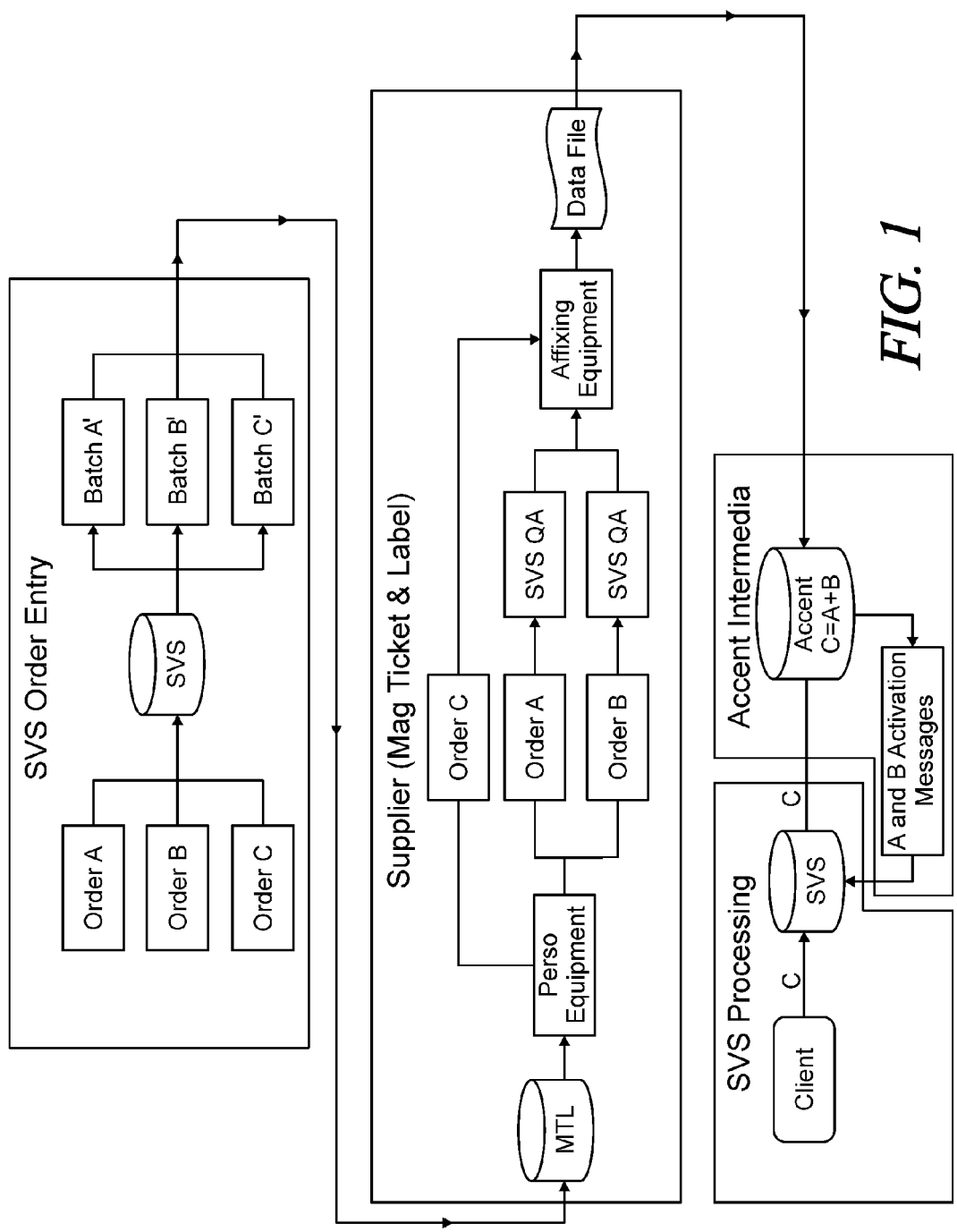
FIG. 1 is a flowchart of one embodiment of the settlement system for valuing multiple accounts with a barcode.
Figure 2:
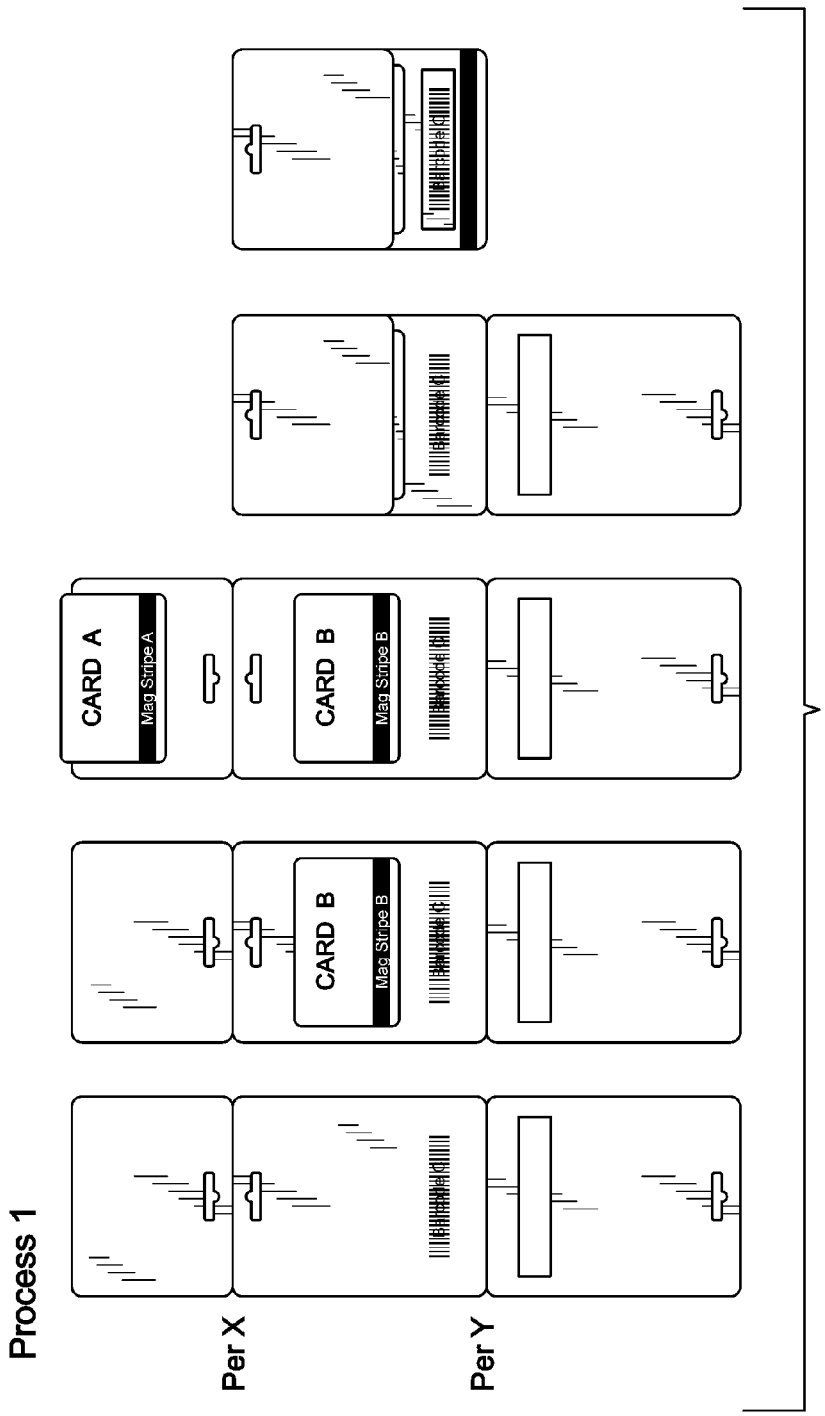
FIG. 2 is an illustration of a card carrier that may be utilized with the settlement system illustrated in FIG. 1 during each step of the manufacturing process.
Figure 3:
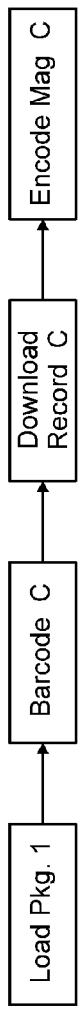
FIG. 3 is a flowchart showing the process for encoding the barcode associated with the two accounts.

More particularly, an embodiment of the present invention is directed toward the display and sale of at least two cards on a single card carrier wherein each card is associated with a particular retailer and both cards are valuated by a single barcode displayed on the package. An important aspect is the process by which data is managed, transmitted, and valued with respect to the issuing and valuation of the co-branded partnership cards. The "Dinner & Movie" concept relies on a 3-way data match necessary for proper valuation. SVS will produce 3 account numbers, one for the Dinner (Restaurant) card, a second card number for the Movie (Theater) card and a third account number from a dedicated BIN range that will tie the aforementioned accounts together. Please refer to FIG. 1 for a visual representation of this process. The process begins with data entry. An SVS data entry manager orders 3 batches of data; order A, B, & C. SVS produces the card range through a batch process; batch A, B, and C.

The data batches are then transmitted to the supplier in charge of the personalization process. In this example, Magnetic Ticket and Label (MT&L) will perform this operation. Once MT&L processes the SVS batches, they are then sent to the individual personalization machines that will encode each magnetic stripe with a unique account number and a cross-reference barcode used for data retrieval. Orders A and B are processed and Quality Assured, Order C is directly sent to an affixing piece of equipment or (Ga-vhe-ren). The affixing equipment (Process 1) will then perform the affixing or tipping process; feed each card individually (Card A and B), glue affix onto the paper carrier with fugitive glue, read the cross reference barcode, write it to a database, and tie it to the common account number (Barcode C) ink jetted onto the paper carrier. Each data record will consist of Mag Stripe A (data field Aa), Mag Stripe B (data field Bb), and Barcode C (data field Cc). Once Process 1 concludes, each package will be personalized and sealed ready to be encoded. Thus we move on to Process 2, each package will be loaded onto a encoding piece of equipment that will read Barcode C, download the record (Record C) from the man MT&L database, encode the paper carriers' magnetic stripe with track and track 2 data. At this point the packaging is complete. Each package now holds two fully functional cards with a common account number (barcode C and ready for final distribution.

The data file containing records A, B and C are subsequently transmitted to a third party supplier that will store the information and wait for valuation requests. This brings us to the last part of the invention. Once the cards are distributed to the field, when a customer purchases a card and requests a valuation, the carrier magnetic stripe is then swiped (SVS Processing) an activation request hits the SVS database and SVS recognizes the special BIN, it then routes the message to Accent Imtermedia where the account number (C) is looked up and validated. Once the account is verified, the accounts associated it with it (A and B) are then communicated back to SVS with a valuation request, both A and B at the same time, if approved, then Cards A and B are live.

Thus, although there have been described particular embodiments of the present invention of a new and useful CO-BRANDED CORRELATED REDEEMABLE CARDS, it is not intended that such references be construed as limitations upon the scope of this invention except as set forth in the following claims.

What is claimed is:

1. A method of valuating at least two separate accounts, each account being associated with a separate retail entity or client, said method comprising:
   creating a first account number that is associated with a first magnetic stripe card, said first account number further associated with a first retail entity or client;
   creating a second account number that is associated with a second magnetic stripe card, said second account number further associated with a second retail entity or client; and
   creating a third account number wherein said third account number specifies a relationship between said first account number and said second account number and said third account number is affixed to a card carrier on which said first magnetic stripe card and said second magnetic stripe card are mounted for resale, and wherein both of said first account number and second account number are valuated upon validation of said third account number.

2. The method of claim 1 wherein said third account number is encoded in a barcode which is affixed to said card carrier.

3. The method of claim 1 wherein validation of said third account number may be performed by at least one of the first retail entity or client or the second retail entity or client.

4. The method of claim 1 wherein the first retail entity or client further comprises a first retail entity operable to redeem the one or more cards associated with the first account, and wherein the second retail entity or client further comprises a second retail entity operable to redeem the one or more cards associated with the second account.

5. A card package for valuating multiple accounts with a single validation, the card package comprising:
   a card package body having a first readable component encoded with an activation request tying number;
   two or more cards attached to the card package body, at least one of the cards associated with a first account associated with a first retailer, and at least one of the cards associated with a second account associated with a second retailer, the activation request tying number linked to an account activation number operable to valuate the first account and the second account;

the first readable component on the card package body readable at a point of sale associated with either of the first retailer and the second retailer.

6. The card package of claim 5, wherein the first readable component comprises a barcode.

7. The card package of claim 5, wherein at least one of the cards further comprises a second readable component associated with the first account, and at least one of the cards further comprises a third readable component associated with the second account, wherein one or more of the second and third readable components are readable at the point of sale of either the first retailer or the second retailer.

8. The card package of claim 7, wherein the second and third readable components further comprise magnetic stripes.

9. A method of activating a plurality of accounts associated with a like number of separate retail entities, the method comprising:

storing in a database one or more account tying numbers, each account tying number linked to a first account activation number operable to activate a first account associated with a first retail entity and a second account activation number operable to activate a second account associated with a second retail entity;

receiving a validation request tying number;

determining if the validation request tying number is associated with one or more of the account tying numbers in the database; and if the validation request tying number is associated with one or more of the account tying numbers, transmitting the first account activation number and the second account activation number.

10. The method of claim 9, wherein transmitting the first account activation number and the second account activation number further comprises routing each of the account activation numbers to an account activation entity.

* * * * *